(12) United States Patent
Kuwabara et al.

(10) Patent No.: US 8,459,671 B2
(45) Date of Patent: Jun. 11, 2013

(54) ALL TERRAIN VEHICLE

(75) Inventors: Naoki Kuwabara, Saitama (JP); Bunzo Seki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 13/005,268

(22) Filed: Jan. 12, 2011

(65) Prior Publication Data

US 2011/0174567 A1 Jul. 21, 2011

(30) Foreign Application Priority Data

Jan. 15, 2010 (JP) ................................. 2010-006767

(51) Int. Cl.
*B62D 7/18* (2006.01)

(52) U.S. Cl.
USPC .................... 280/93.512; 280/93.51; 180/374

(58) Field of Classification Search
USPC ................. 280/93.51, 93.512; 180/252, 253, 180/374
See application file for complete search history.

(56) References Cited

U.S. PATENT DOCUMENTS

| | | | | |
|---|---|---|---|---|
| 4,194,760 A * | 3/1980 | Shiomi et al. | ............ | 280/86.753 |
| 4,530,512 A * | 7/1985 | Evlanov | .................... | 280/86.753 |
| 4,635,957 A * | 1/1987 | Merkle | .................. | 280/124.136 |
| 4,875,703 A * | 10/1989 | Murakami | ............. | 280/124.138 |
| 4,934,729 A * | 6/1990 | Murata et al. | .......... | 280/124.136 |
| 4,948,160 A * | 8/1990 | Barry | ....................... | 280/86.753 |
| 5,048,860 A * | 9/1991 | Kanai et al. | .............. | 280/86.757 |
| 5,104,141 A * | 4/1992 | Grove et al. | ............. | 280/86.753 |
| 5,180,180 A * | 1/1993 | Yamashita et al. | ............. | 180/253 |
| 5,308,032 A * | 5/1994 | Ohta | .......................... | 248/230.2 |
| 6,089,582 A * | 7/2000 | Hasshi | ..................... | 280/93.512 |
| 6,431,569 B2 * | 8/2002 | Handa | ................... | 280/124.138 |
| 7,287,619 B2 * | 10/2007 | Tanaka et al. | .................. | 180/291 |
| 7,316,288 B1 * | 1/2008 | Bennett et al. | ................. | 180/413 |
| 7,441,788 B2 * | 10/2008 | Leclair | ..................... | 280/93.512 |
| 7,610,132 B2 * | 10/2009 | Yanai et al. | ..................... | 701/41 |
| 7,628,415 B2 * | 12/2009 | Kitamura et al. | ...... | 280/124.154 |
| 7,669,690 B2 * | 3/2010 | Makabe et al. | ............... | 180/444 |
| 7,819,220 B2 * | 10/2010 | Sunsdahl et al. | ............. | 180/312 |
| 7,954,835 B2 * | 6/2011 | Nakamura et al. | ..... | 280/124.135 |
| 2005/0257989 A1 * | 11/2005 | Iwami et al. | .................. | 180/443 |
| 2011/0174568 A1 * | 7/2011 | Kuwabara et al. | ............ | 180/376 |

FOREIGN PATENT DOCUMENTS

JP 2008-302813 A 12/2008

* cited by examiner

*Primary Examiner* — Paul N Dickson
*Assistant Examiner* — Timothy Wilhelm
(74) *Attorney, Agent, or Firm* — Birch, Stewart, Kolasch & Birch, LLP

(57) ABSTRACT

A tie rod supporting part is provided in an area θ2 between a lateral line passing an inner side of a wheel and a king pin axis in a front view of the vehicle in a non-steering state. More specifically, the tie rod supporting part is arranged on the central side of the vehicle off the side of the wheel. The tie rod supporting part never interferes with the wheel and can be arranged near the central center of the wheel. As a result, a dimension in the height of the tie rod supporting part extending from the knuckle can be reduced and the knuckle can be miniaturized and lightened.

12 Claims, 6 Drawing Sheets

ABSTRACT

ALL TERRAIN VEHICLE

CROSS-REFERENCE TO RELATED APPLICATIONS

The present application claims priority under 35 USC 119 to Japanese Patent Application No. 2010-006767 filed on Jan. 15, 2010 the entire contents of which are hereby incorporated by reference.

BACKGROUND OF THE INVENTION

1. Field of the Invention

This invention relates to an all terrain vehicle provided with a small-sized knuckle.

2. Description of Background Art

A steering structure for steering a wheel around a king pin axis by coupling a knuckle to the wheel and pushing and pulling the knuckle by a tie rod has been widely adopted. See, for example, FIG. 3 of JP-A No. 2008-302813.

More specifically, as shown in FIG. 3 of JP-A No. 2008-302813, the knuckle (12) is supported by a shock absorber (13) (numerals in parentheses denote reference signs described in JP-A No. 2008-302813, the same hereafter) and a lower arm (11). The wheel (W), shown by an imaginary line, is supported by the knuckle (12). When the tie rod (23) is pushed or pulled, the wheel (W) is steered around the king pin axis (K).

The knuckle (12) is supported at a lower first pin joint (20) and an upper second pin joint (21) by the shock absorber (13).

The upper second pin joint (21) is arranged immediately above the wheel (W). Therefore, an upper arm (12c) of the knuckle (12) becomes long and as a result, the knuckle (12) is large in size.

Weight reduction is demanded for a small-sized vehicle represented by an all terrain vehicle and the miniaturization of the knuckle (12) is desired to reduce the weight of the vehicle.

SUMMARY AND OBJECTS OF THE INVENTION

An object of an embodiment of the present invention is to provide an all terrain vehicle provided with a small-sized knuckle.

According to an embodiment of the present invention, an all terrain vehicle is provided with a body frame, a power generation engine attached to the body frame for generating power, a transmission system for transmitting the output generated in the power generation engine and a final reduction gear attached to the body frame for decelerating the power transmitted by the transmission system. A drive shaft is provided that extends in a direction of vehicle width for transmitting power from the final reduction gear to a wheel. A strut damper is provided wherein an upper end is coupled to the body frame and extends downwardly. A knuckle supporting member extends downwardly from a lower part of the strut damper. A lower arm extends in the direction of vehicle width and couples a lower part of the knuckle supporting member to the body frame. A knuckle is attached to the knuckle supporting member rotatably around a king pin axis and supports the wheel. A tie rod extends in the direction of vehicle width and rotates the knuckle around the king pin axis and a steering shaft which is turnably supported by the body frame for reciprocating the tie rod. The final reduction gear is arranged in the center in the direction of vehicle width with a coupling part of the steering shaft and the tie rod being arranged on the upside of the final reduction gear. The tie rod is arranged substantially in parallel with the lower arm with the king pin axis being provided in a state in which it is inclined with its upper part approaching the center of vehicle width. A tie rod supporting part is formed in an upper part of the knuckle for coupling the knuckle to the tie rod in an area between a lateral line passing an inner side of the wheel and the king pin axis in a front view of the vehicle in a non-steering state.

According to an embodiment of the present invention, either of the knuckle supporting member or the tie rod supporting part is arranged in front of the drive shaft in a side view of the vehicle, the other is arranged at the back of the drive shaft and a caliper supporting part that supports a brake caliper for braking the wheel is formed in the knuckle in a position on the downside of the tie rod supporting part.

According to an embodiment of the present invention, the tie rod supporting part is provided to an extended part extending to the rear of the vehicle from the knuckle.

According to an embodiment of the present invention, the knuckle supporting member is provided with an upper part supporting part for supporting the upper part of the knuckle and a lower part supporting part for supporting a lower part of the knuckle, either of the upper part supporting part or the lower part supporting part is coupled to the knuckle with a dowel structure wherein a dowel is inserted into a dowel hole and the other is coupled to the knuckle by a bolt.

According to an embodiment of the present invention, the tie rod supporting part is provided in the area between the lateral line passing the inner side of the wheel and the king pin axis in the front view of the vehicle in a non-steering state. More specifically, the tie rod supporting part is arranged on the central side of the vehicle off the side of the wheel. Therefore, the tie rod supporting part never interferes with the wheel and can be arranged near the rotational center of the wheel. As a result, a dimension in the height of the tie rod supporting part extending from the knuckle can be reduced and the knuckle can be miniaturized and lightened.

According to an embodiment of the present invention, either of the knuckle supporting member or the tie rod supporting part is arranged in front of the drive shaft in the side view of the vehicle, the other is arranged at the back of the drive shaft, and the caliper supporting part for supporting the brake caliper for braking the wheel is formed in the knuckle in the position to the downside of the tie rod supporting part.

When the knuckle supporting member is arranged in front of the drive shaft in the vehicle, space is formed at the back of the drive shaft in the vehicle. Or when the knuckle supporting member is arranged at the back of the drive shaft in the vehicle, space is formed in front of the drive shaft in the vehicle.

A degree of freedom in a layout of the tie rod and the brake caliper is specially enhanced by arranging the tie rod supporting part and the caliper supporting part in this space.

According to an embodiment of the present invention, the tie rod supporting part is provided to the extended part extending to the rear of the vehicle from the knuckle. The tie rod can be coupled to the extended part, the attachment of the tie rod is facilitated, and the man-hours for assembling the vehicle can be reduced.

According to an embodiment of the present invention, the knuckle supporting member is provided with the upper part supporting part that supports the upper part of the knuckle and the lower part supporting part that supports the lower part of the knuckle, either of the upper part supporting part or the lower part supporting part is coupled to the knuckle with a dowel structure wherein the dowel is inserted into the dowel hole, and the other is coupled to the knuckle by the bolt.

If the structure is adopted wherein the upper and lower parts of the knuckle are coupled to the upper part supporting part and the lower part supporting part on the side of the knuckle supporting member each by a bolt and a nut the work required for aligning the upper part of the knuckle with the upper part supporting part and inserting the bolt and work for aligning the lower part of the knuckle with the lower part supporting part and inserting the bolt is reduced. Thus, the man-hours for assembly increases.

In the meantime, according to an embodiment of this invention, in view of the fact that the insertion of the dowel into the dowel hole and the alignment of the upper part or the lower part of the knuckle with the upper part supporting part or the lower part supporting part and the insertion of the bolt have only to be executed once, the alignment has only to be executed in only one location and the bolt has only to be fastened in only one location. Thus, the man-hours for assembly can be greatly reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
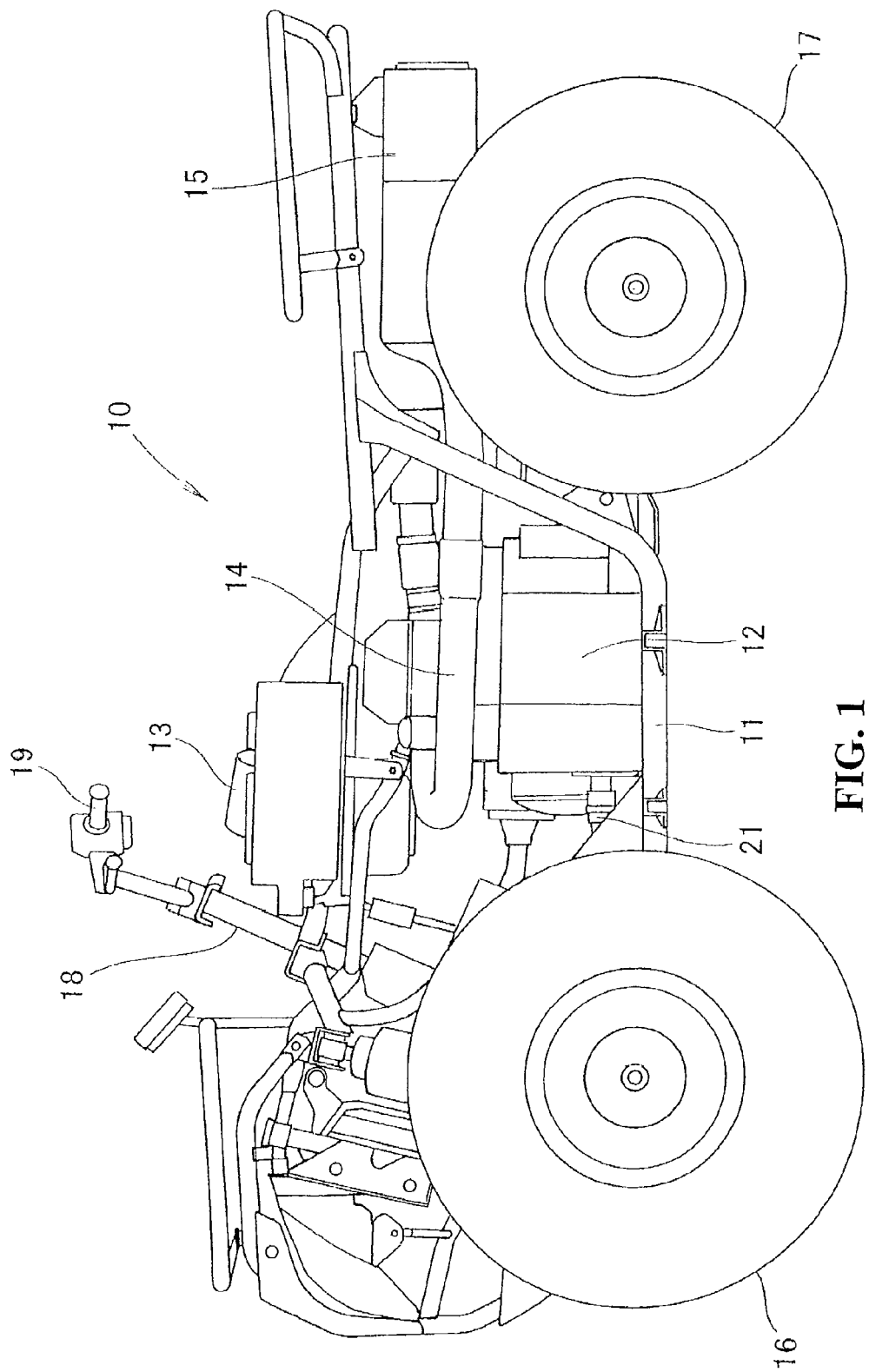
FIG. 1 is a left side view showing a vehicle according to the present invention.

Referring to the attached drawings, an embodiment of the present invention will be described below. The drawings shall be viewed in a direction of reference signs.

Referring to the drawings, the embodiment of the present invention will be described below.

As shown in FIG. 1, a vehicle 10 is a small-sized vehicle which is provided with a power generation engine 12 such as a gasoline engine in the center of a body frame 11, in which fuel is mixed with air taken in an air cleaner 13 provided on the body frame 11 and it is combusted in the power generation engine 12, in which exhaust gas is exhausted outside via an exhaust pipe 14 extending from the power generation engine 12 and a muffler 15 connected to a rear end of the exhaust pipe 14, and in which acquired power is transmitted to a front wheel 16 rotatably attached to a lower part of the front of the body frame 11 and/or a rear wheel 17 rotatably attached to a lower part of the rear of the body frame 11 so as to operate the small-sized vehicle. A steering shaft 18 is provided which is turnably attached to an upper part of the front of the body frame 11 and a handlebar 19 for turning the steering shaft 18.

A type of the power generation engine 12 does not matter if only the power generation engine is a driving source such as a gasoline engine, a diesel engine and an electric motor.

As irregularities of a road surface are absorbed by deforming a low-pressure tire. The wide tire can inhibit sinking even if the road surface is soft when the front wheel 16 and the rear wheel 17 are the wide and low-pressure special tires called balloon tires. This type of vehicle 10 is called an all terrain vehicle.

Figure 2:
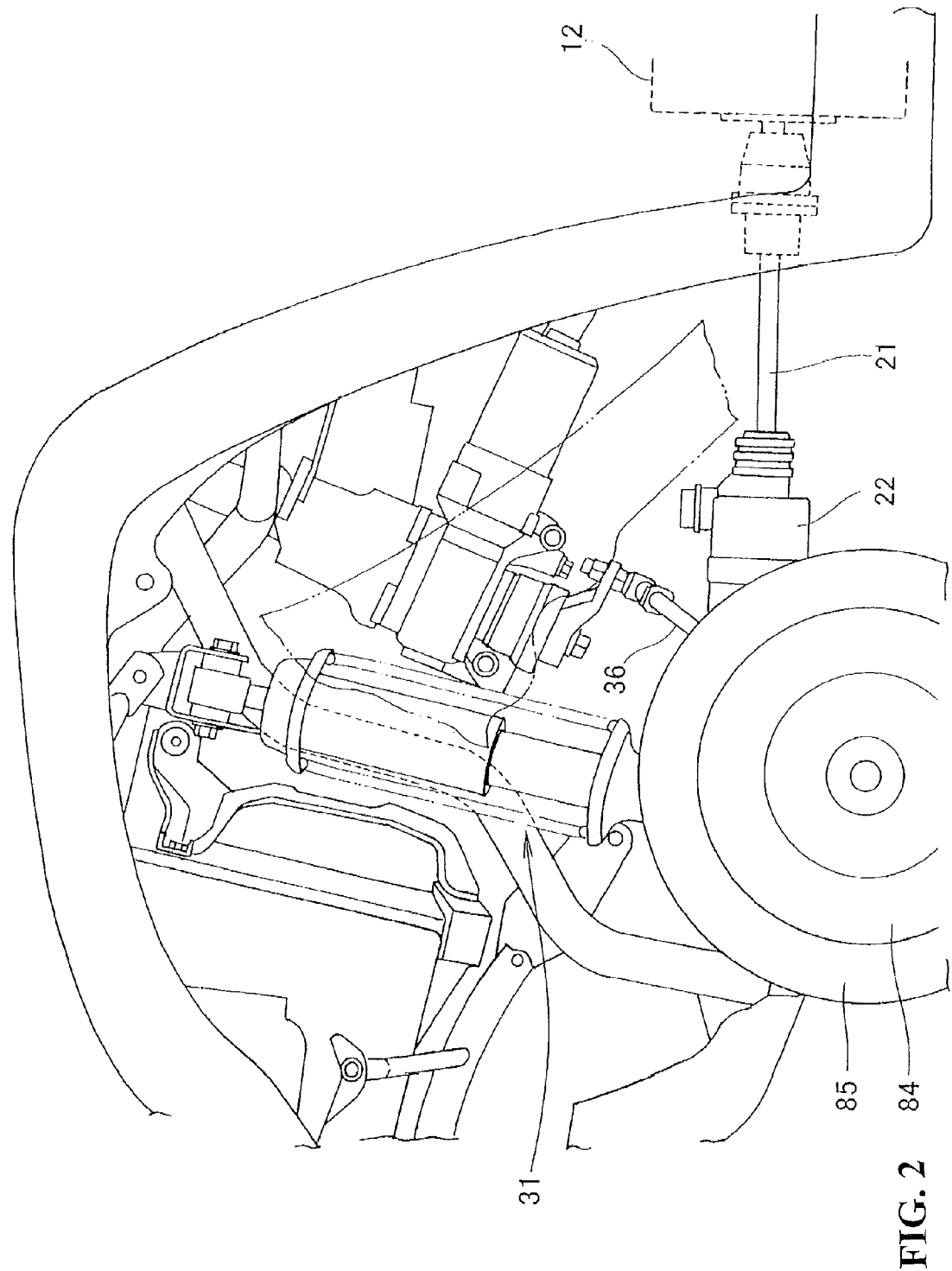
FIG. 2 shows a suspension system of a wheel.

Power generated in the power generation engine 12 is transmitted to a final reduction gear 22 via a transmission system 21 such as a propeller shaft as shown in FIG. 2.

Figure 3:
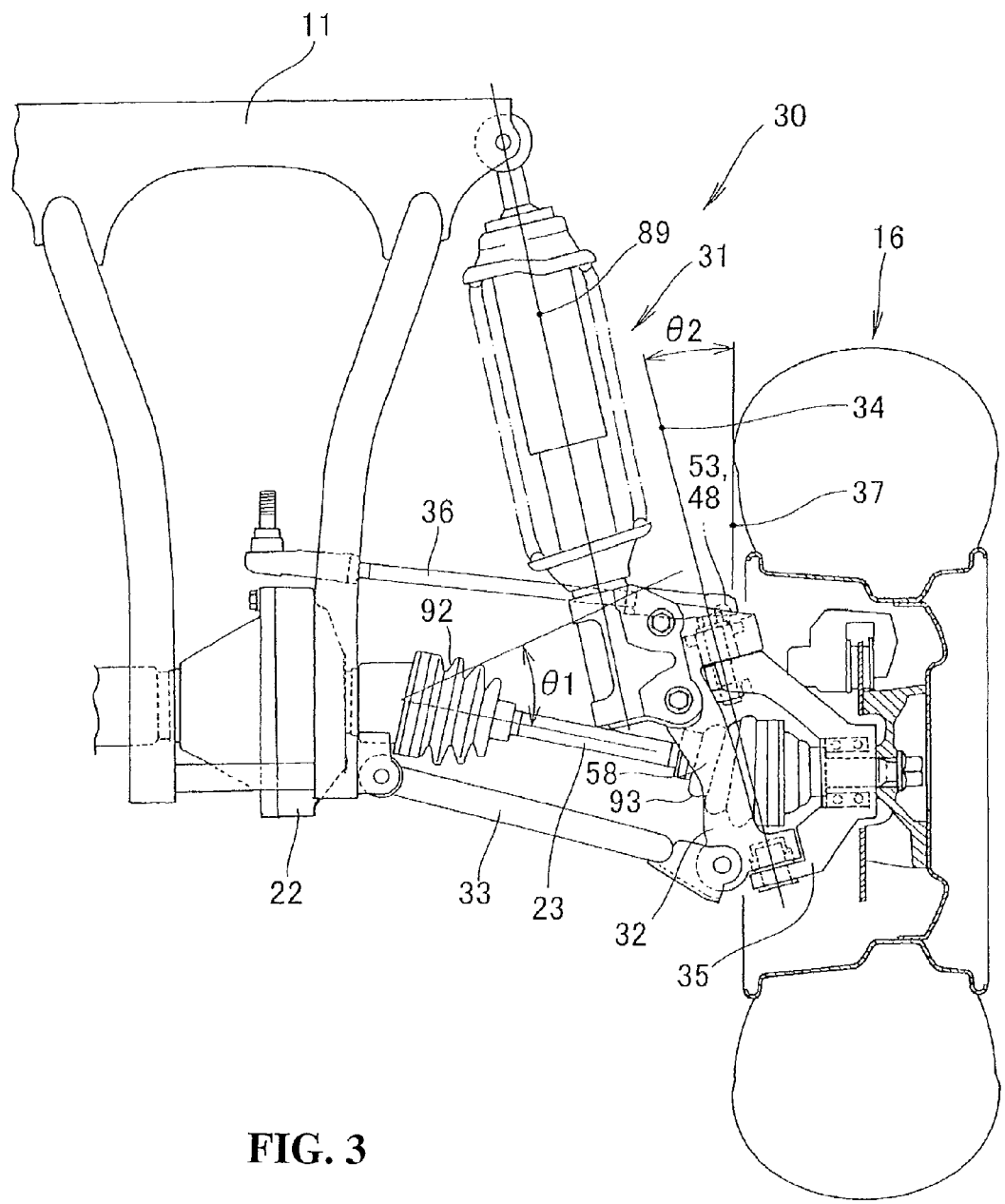
FIG. 3 is a front view showing the suspension system of the wheel.

As shown in FIG. 3, power is transmitted to the front wheel 16 via a drive shaft 23 extending in a direction of vehicle width from the final reduction gear 22 and the front wheel 16 is rotatively driven.

As shown in FIG. 3, a suspension system 30 of the wheels is configured by a strut damper 31 an upper end of which is coupled to the body frame 11 and which extends downwardly. A knuckle supporting member 32 extends downwardly from a lower part of the strut damper 31 with a lower arm 33 extending in the direction of vehicle width for coupling a lower part of the knuckle supporting member 32 to the body frame 11. A knuckle 35 is attached to the knuckle supporting member 32 rotatably around a king pin axis 34 for supporting the front wheel 16. A tie rod 36 extends in the direction of the vehicle width for rotating the knuckle 35 around the king pin axis 34. The details of each component will be described below.

The drive shaft 23 is vertically swung in a range θ1 of a swing according to a vertical motion of the front wheel 16.

In addition, a spherical joint 53 (the details will be described later) is attached to an end of the tie rod 36 and is coupled to a tie rod supporting part 48 (the details will be described later) extends in a direction of the surface and the back of the drawing (in a longitudinal direction of the vehicle) from the tie rod 36.

The tie rod supporting part 48 is provided in an area θ2 between a lateral line 37 passing an inner face of the front wheel 16 and the king pin axis 34.

Figure 4:
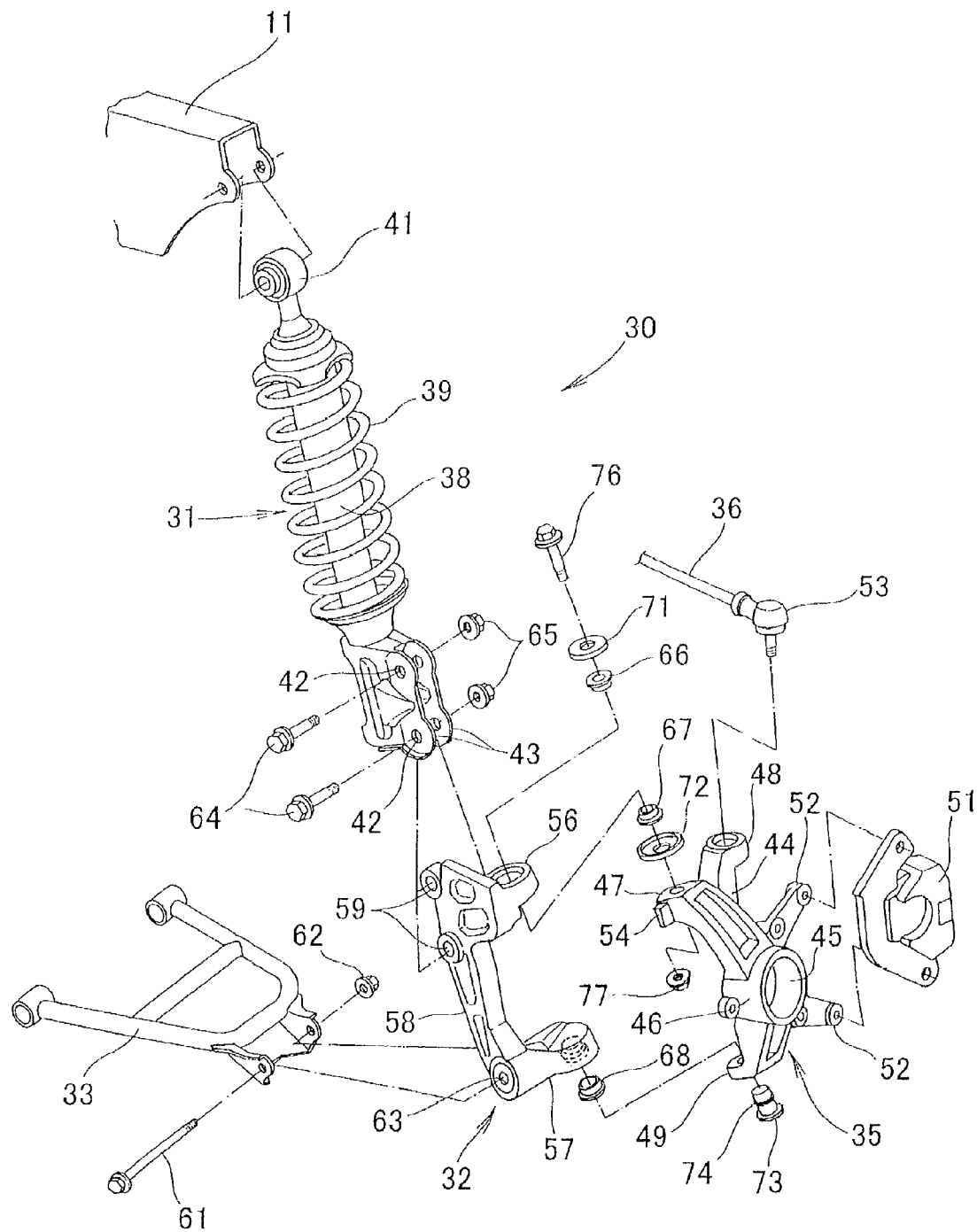
FIG. 4 is an exploded perspective view showing the suspension system of the wheel.

As shown in FIG. 4, the strut damper 31 is configured by a damper part 38 that damps shock and a spring 39 which is provided around the damper part 38 and which restores the compressed damper part 38 to original length, and an upper end 41 of the damper part 38 is detachably coupled to the body frame 11. Longitudinal coupling parts 43 each of which has a plurality (two in this example) of bolt holes 42 are provided to a lower part of the damper part 38.

The knuckle 35 is an integrated part where an upper arm 47 and an extending part 44 extend upward from a boss 46 having a central hole 45. A lower arm 49 extends downwardly and caliper supporting parts 52 support a brake caliper 51 that laterally extend.

The extending part 44 is extended in a longitudinal direction of the vehicle and is provided with the tie rod supporting part 48. The spherical joint 53 at an end of the tie rod 36 is coupled to the tie rod supporting part 48. A stopper piece 54 extends forward in the vehicle from the upper arm 47. The action of the stopper piece 54 will be described later.

The lower arm 33 is an A-shaped pipe part in a top view for example.

The knuckle supporting member 32 is a U-shaped member configured by an upper part supporting part 56 that supports an upper part (the upper arm 47) of the knuckle 35, a lower part supporting part 57 that supports a lower part (the lower arm 49) of the knuckle 35 and a bridge part 58 that connects the upper part supporting part 56 and the lower part supporting part 57. Bolt holes 59 bored in the longitudinal direction of the vehicle are provided to an upper part of the bridge part 58 and a bolt hole 63 connected to the lower arm 33 by a bolt 61 and a nut 62 is provided to the lower part.

An upper part of the knuckle supporting member 32 can be coupled to the lower part of the damper part 38 by putting the upper part of the knuckle supporting member 32 between the coupling parts 43 in the lower part of the damper part 38, inserting each bolt 64 into each bolt hole 42 and each bolt hole 59 and fastening each nut 65 to each bolt.

Figure 5:
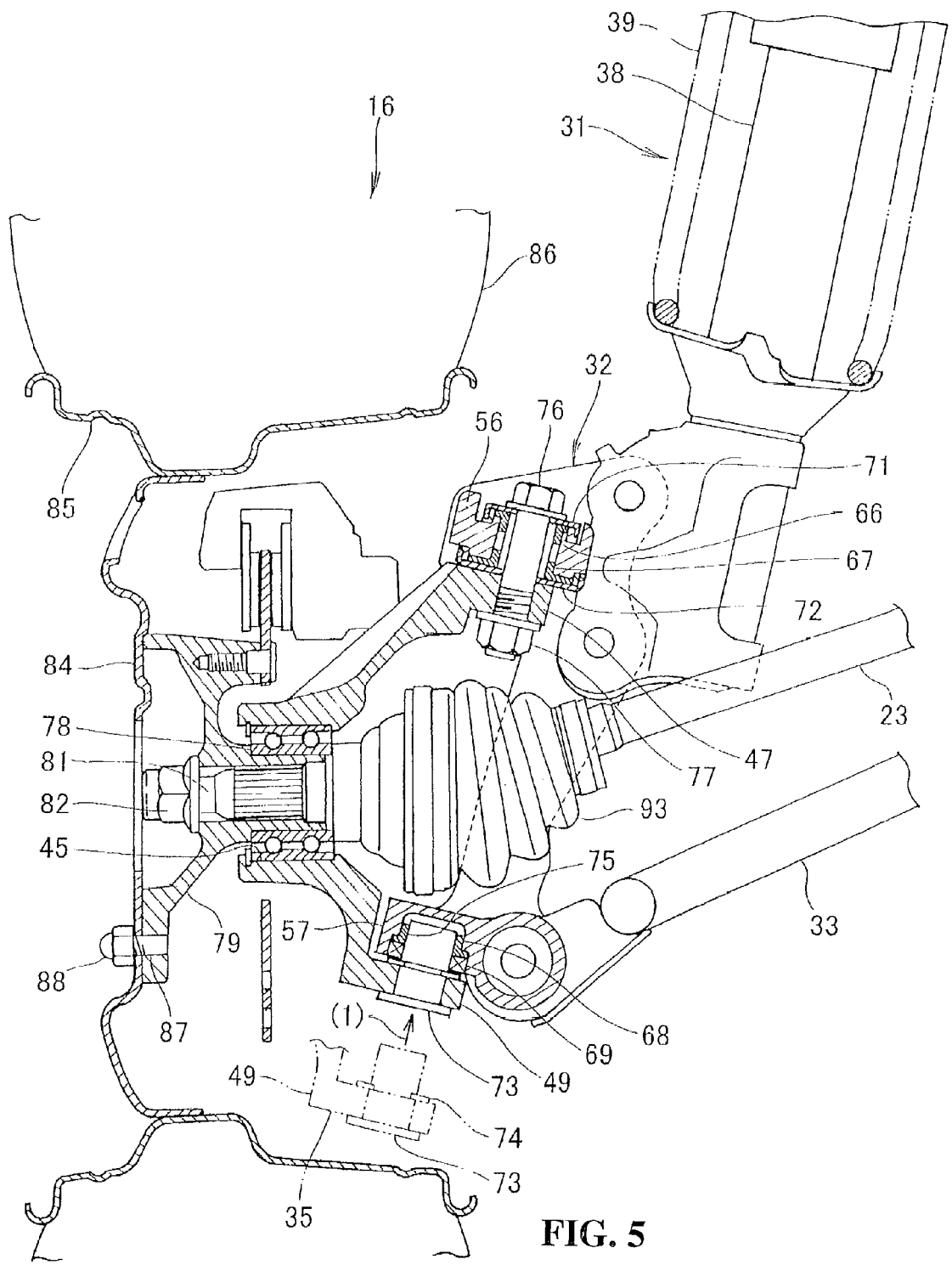
FIG. 5 is a back view showing the suspension system of the wheel.

Referring to FIG. 5 (a sectional view showing a main part viewed from the rear of the vehicle), the coupling of the knuckle supporting member 32 and the knuckle 35 will be described below.

As shown in FIG. 5, bushings 66, 67 having an L-shaped section are attached to the upper part supporting part 56, a bushing 68 having an L-shaped section is attached to the lower part supporting part 57, and a sealing member 69 is attached to the bushing. A presser lid 71 to which sealant is applied is attached to the bushing 66 from the upside and a presser lid 72 to which sealant is applied is attached to the bushing 67 from the downside.

At this time, the drive shaft 23 is not attached to the knuckle 35. A dowel 73 in the shape of a headed pin is inserted into the lower arm 49 of the knuckle 35 shown by an imaginary line upward from the downside and a snap ring 74 is fitted on the way of the dowel 73. As a result, the dowel 73 is prevented from falling out of the lower arm 49. As shown by an arrow (1), the knuckle supporting member 32 is wholly raised. The dowel 73 is inserted into a dowel hole 75 of the lower part supporting part 57 by the rise and the upper arm 47 is hit on the upper part supporting part 56 from the downside.

A bolt 76 is inserted into the bushings 66, 67 having the L-shaped section from the upside and is made to further pierce the upper arm 47. A nut 77 is fastened to the bolt 76.

A bearing 78 is fitted into the central hole 45 of the knuckle 35, a hub member 79 is fitted to the bearing 78, an end 81 of the drive shaft 23 is inserted into the hub member 79, and a nut 82 is attached to the end 81. As a result, the hub member 79 can be rotatably supported by the knuckle 35.

The front wheel 16 is configured by a spoke section 84, a limb 85 fixed to the periphery of the spoke section 84 and a tire 86 attached to the limb 85.

A bolt 87 extends outside the hub member 79 in the direction of vehicle width. The front wheel 16 can be attached to the hub member 79 by attaching the hub member 79 to the bolt 87 and tightening a nut 88.

Next, the action of the above-mentioned suspension system 30 will be described.

As shown in FIG. 3, the tie rod supporting part 48 is provided in an area θ2 between the lateral line 37 passing an inner side of the wheel and the king pin axis 34 in a front view of the vehicle in a non-steering state. More specifically, the tie rod supporting part 48 is arranged on the central side of the vehicle off the side of the wheel. Therefore, the tie rod supporting part 48 never interferes with the wheel 16 and can be arranged near the rotational center of the wheel. As a result, a dimension in the height of the tie rod supporting part 48 extending from the knuckle 35 can be reduced and the knuckle 35 can be miniaturized and lightened.

Figure 6:
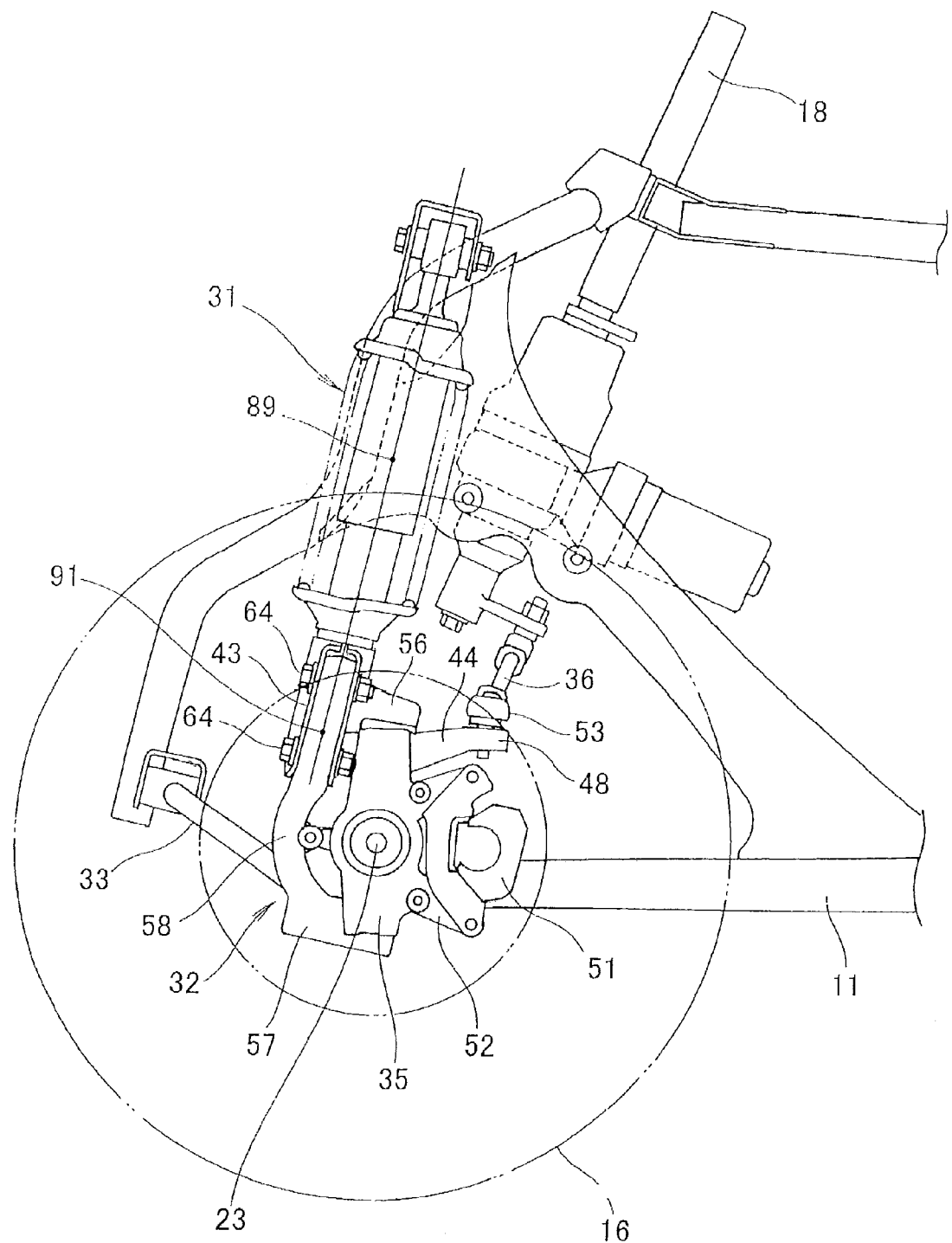
FIG. 6 is a side view showing the suspension system of the wheel.

As shown in FIG. 6, either of the knuckle supporting member 32 or the tie rod supporting part 48 is arranged in front of the drive shaft 23 in a side view of the wheel, the other is arranged at the back of the drive shaft, and the caliper supporting part 52 that supports the brake caliper 51 for braking the wheel is formed in the knuckle 35 in a position below the tie rod supporting part 48.

When the knuckle supporting member 32 is arranged in front of the drive shaft 23 in the vehicle, space is formed at the back of the drive shaft 23 in the vehicle or when the knuckle supporting member 32 is arranged at the back of the drive shaft 23 in the vehicle, a space is formed in front of the drive shaft 23 in the vehicle.

A degree of freedom in a layout of the tie rod 36 and the brake caliper 51 is especially enhanced by arranging the tie rod supporting part 48 and the caliper supporting part 52 in this space.

The tie rod supporting part 48 is provided to the extending part 44 extending to the rear of the vehicle from the knuckle. The tie rod 36 can be coupled to the extending part 44, the attachment of the tie rod 36 is facilitated, and the man-hours for assembling the vehicle can be reduced.

As described in relation to FIG. 4, the knuckle supporting member 32 is provided with the upper part supporting part 56 that supports the upper part of the knuckle 35 and the lower part supporting part 57 that supports the lower part of the knuckle 35, either of the upper part supporting part 56 or the lower part supporting part 57 is coupled to the knuckle 35 with structure that a dowel 73 is inserted into a dowel hole 75 as shown in FIG. 5, and the other is coupled to the knuckle 35 by a bolt 76.

If the structure wherein the upper and lower parts of the knuckle are fastened to the upper part supporting part and the lower part supporting part of the knuckle supporting member by each bolt and each nut is adopted, the work of aligning the upper part of the knuckle with the upper part supporting part and inserting the bolt and work of aligning the lower part of the knuckle with the lower part supporting part and inserting the bolt are required, the man-hours for assembly increases.

In the meantime, according to an embodiment of the present invention, in view of the fact that the insertion of the dowel 73 into the dowel hole 75, and then the alignment of the upper part or the lower part of the knuckle 35 with the upper part supporting part 56 or the lower part supporting part 57 and the insertion of the bolt 76 have only to be executed and the alignment and the fastening of the bolt have only to be respectively executed in only one location, the man-hours for assembly can be greatly reduced.

The suspension system according to the present invention is suitable for an all terrain vehicle in this embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An all terrain vehicle comprising:
  a body frame;
  a power generation engine which is attached to the body frame for generating power;
  a transmission system for transmitting output generated in the power generation engine;
  a final reduction gear attached to the body frame for decelerating the power transmitted by the transmission system;
  a drive shaft extending in a direction of a width of the vehicle for transmitting the power from the final reduction gear to a wheel;
  a strut damper an upper end of which is coupled to the body frame and extends downwardly;

a knuckle supporting member extending downwardly from a lower part of the strut damper;

a lower arm extending in a width direction of the vehicle for coupling a lower part of the knuckle supporting member to the body frame;

a knuckle attached to the knuckle supporting member rotatably around a king pin axis for supporting the wheel;

a tie rod extending in the width direction of the vehicle for rotating the knuckle around the king pin axis; and a steering shaft turnably supported by the body frame for reciprocating the tie rod, wherein the final reduction gear is arranged in the center in the width direction of the vehicle;

a coupling part of the steering shaft and the tie rod are arranged on the upside of the final reduction gear;

the tie rod is arranged substantially in parallel with the lower arm;

the king pin axis is inclined with its upper part approaching the center of vehicle width; and a tie rod supporting part formed in an upper part of the knuckle so as to couple the knuckle to the tie rod is provided in an area between a lateral line passing an inner side of the wheel and the king pin axis in a front view of the vehicle in a non-steering state, wherein either of the knuckle supporting member or the tie rod supporting part is arranged in front of the drive shaft in a side view of the vehicle and the other is arranged at the back of the drive shaft; and a caliper supporting part for supporting a brake caliper for braking the wheel is formed in the knuckle in a position on the downside of the tie rod supporting part.

2. The all terrain vehicle according to claim 1, wherein the tie rod supporting part is provided to an extended part extending to the rear of the vehicle from the knuckle.

3. The all terrain vehicle according to claim 2, wherein the knuckle supporting member is provided with an upper part supporting part for supporting an upper part of the knuckle and a lower part supporting part for supporting a lower part of the knuckle; and either of the upper part supporting part or the lower part supporting part is coupled to the knuckle with a dowel structure wherein a dowel is inserted into a dowel hole and the other is coupled to the knuckle by a bolt.

4. The all terrain vehicle according to claim 1, wherein the knuckle supporting member is provided with an upper part supporting part for supporting an upper part of the knuckle and a lower part supporting part for supporting a lower part of the knuckle; and either of the upper part supporting part or the lower part supporting part is coupled to the knuckle with a dowel structure wherein a dowel is inserted into a dowel hole and the other is coupled to the knuckle by a bolt.

5. The all terrain vehicle according to claim 1, wherein the tie rod supporting part is arranged on a central side of the vehicle off the side of the wheel.

6. The all terrain vehicle according to claim 5, wherein the positioning of the tie rod supporting part is arranged near a rotational center of the wheel while never interfering with the wheel wherein a dimension of the height of the tie rod supporting part extending from the knuckle is reduced and the knuckle is miniaturized.

7. A knuckle for use with an all terrain vehicle comprising:

a strut damper an upper end of which is adapted to be coupled to a body frame, said strut damper extending downwardly;

a knuckle supporting member extending downwardly from a lower part of the strut damper;

a lower arm extending in a width direction of the vehicle for coupling a lower part of the knuckle supporting member to the body frame;

a knuckle attached to the knuckle supporting member rotatably around a king pin axis adapted for supporting a wheel;

a tie rod extending in the width direction of the vehicle for rotating the knuckle around the king pin axis; and a steering shaft adapted to be turnably supported by the body frame for reciprocating the tie rod, wherein a final reduction gear is arranged in the center in the width direction of the vehicle;

a coupling part of the steering shaft and the tie rod are arranged on the upside of the final reduction gear;

the tie rod is arranged substantially in parallel with the lower arm;

the king pin axis is inclined with its upper part approaching the center of vehicle width; and a tie rod supporting part formed in an upper part of the knuckle so as to couple the knuckle to the tie rod is provided in an area between a lateral line passing an inner side of the wheel and the king pin axis in a front view of the vehicle in a non-steering state, wherein either of the knuckle supporting member or the tie rod supporting part is arranged in front of a drive shaft in a side view of the vehicle and the other is arranged at the back of the drive shaft; and a caliper supporting part for supporting a brake caliper for braking the wheel is formed in the knuckle in a position on the downside of the tie rod supporting part.

8. The knuckle for use with an all terrain vehicle according to claim 7, wherein the tie rod supporting part is provided to an extended part extending to the rear of the vehicle from the knuckle.

9. The knuckle for use with an all terrain vehicle according to claim 8, wherein the knuckle supporting member is provided with an upper part supporting part for supporting an upper part of the knuckle and a lower part supporting part for supporting a lower part of the knuckle; and either of the upper part supporting part or the lower part supporting part is coupled to the knuckle with a dowel structure wherein a dowel is inserted into a dowel hole and the other is coupled to the knuckle by a bolt.

10. The knuckle for use with an all terrain vehicle according to claim 7, wherein the knuckle supporting member is provided with an upper part supporting part for supporting an upper part of the knuckle and a lower part supporting part for supporting a lower part of the knuckle; and either of the upper part supporting part or the lower part supporting part is coupled to the knuckle with a dowel structure wherein a dowel is inserted into a dowel hole and the other is coupled to the knuckle by a bolt.

11. The knuckle for use with an all terrain vehicle according to claim 7, wherein the tie rod supporting part is arranged on a central side of the vehicle off the side of a wheel.

12. The knuckle for use with an all terrain vehicle according to claim 11, wherein the positioning of the tie rod supporting part is arranged near a rotational center of the wheel while never interfering with the wheel wherein a dimension of the height of the tie rod supporting part extending from the knuckle is reduced and the knuckle is miniaturized.

* * * * *